Patented June 17, 1952

2,601,219

UNITED STATES PATENT OFFICE 2,601,219

PROCESS OF MAKING O-ETHYL S-ETHYL O-PARA NITROPHENYL THIOPHOSPHATE

Henry L. Morrill, Clayton, Mo., assignor to Monsanto Chemical Company, St. Louis, Mo., a corporation of Delaware No Drawing. Application July 17, 1948, Serial No. 39,379

2 Claims. (Cl. 260—461)

This invention relates to O-ethyl-S-ethyl-O-p-nitrophenyl thiophosphate and its preparation.

It is known that O,O-diethyl-O-p-nitrophenyl thiophosphate possesses insecticidal properties. As a result of research conducted upon the insecticidal activity of O,O-diethyl-O-p-nitrophenyl thiophosphate, it has now been found that this compound can be made to undergo rearrangement with the resulting provision of a certain novel compound which is characterized by greatly enhanced insecticidal activity. This novel compound is O-ethyl-S-ethyl-O-p-nitrophenyl thiophosphate having the structural formula:

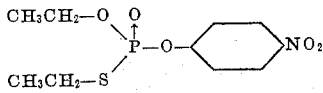

I have found that the novel compound of the present invention may be prepared by heating O,O - diethyl - O - p - nitrophenyl thiophosphate, either in its pure form or in combination with small amounts of impurities, for example, 0.1 to 5% or more of triethyl thiophosphate or triethyl phosphate, from one to ten hours or more at temperatures in the range of approximately 140° to approximately 180° C. This heating process may be carried out under reduced pressure or at atmospheric pressure.

The following examples will serve to illustrate the novel compound of this invention and its method of preparation.

Example I

A mixture of 95 g. of O,O-diethyl-O-p-nitrophenyl thiophosphate and 5 g. of triethyl thiophosphate was heated at 160–170° C./10 mm. for approximately 10 hours. The resulting product was steam distilled to remove the residual triethyl thiophosphate remaining after the reaction. The product was then analyzed for total sulfur content, employing for this purpose the sodium peroxide oxidation of the sulfur content of the compound to the sulfate radical and the subsequent determination of the sulfate radical. A separate portion of the compound was analyzed for the presence of sulfur in the form of P→S by means of an alkaline hydrolysis of the sample followed by bromine oxidation and subsequent determination of the sulfate radical. The phosphorus content of the compound was determined by titrating the alkali consumed on alkaline hydrolysis of the sample. The analytical results from the foregoing analyses were as follows:

Total sulfur calculated 11.0%; found 11.1%. P→S sulfur calculated 0%; found trace. Phosphorous, calculated 10.6%; found 10.6%.

Similar analyses were made on a specimen of O,O-diethyl-O-p-nitrophenyl thiophosphate and the results were as follows:

Total sulfur calculated 11.0%; found 11.1%. P→S sulfur, calculated 11.0%; found 10.2%. Phosphorus, calculated 10.6%; found 10.4%.

Crystallizing points on the starting material and the final product were determined. It was found that the crystallizing point of O,O-diethyl-O-p-nitrophenyl thiophosphate was +1.4° C. whereas the crystallizing point of the mixture of O,O-diethyl-O-p-nitrophenyl thiophosphate and O-ethyl-S-ethyl-O-p-nitrophenyl thiophosphate thus obtained was —36° C. Insecticidal tests show the latter compound to be several times more active than O,O-diethyl-O-p-nitrophenyl thiophosphate. Moreover, the new compound showed far less decrease in activity over a period of time.

Similar runs were made using O,O-diethyl-O-p-nitrophenyl thiophosphate containing respectively 0.1, 0.5 and 2% by weight of triethyl thiophosphate. Another series was made using O,O-diethyl-O-p-nitrophenyl thiophosphate containing 0.1, 0.5, 2 and 5% respectively of triethyl phosphate in place of triethyl thiophosphate. In each instance analysis revealed the presence of O-ethyl-S-ethyl-O-p-nitrophenyl thiophosphate and the products were materially enhanced in insecticidal activity.

Example II

A 200 g. portion of crude O,O-diethyl-O-p-nitrophenyl thiophosphate containing 7.5% of free p-nitrophenol and 15% of triethyl thiophosphate was washed with 3% aqueous sodium carbonate solution to remove the free p-nitrophenol. The material was then washed with water. The washed material was steam distilled to remove the triethyl thiophosphate. The material was then heated at 160 to 170° C./10 mm. for 5 hours. The resulting product upon analysis was found to be composed of 46% of O,O-diethyl-O-p-nitrophenyl thiophosphate and 54% of O-ethyl S-ethyl-O-p-nitrophenyl thiophosphate. Further heating of the composition at 160 to 170° C./10 mm. for an additional 5 hours resulted in a product which was substantially all O-ethyl-S-ethyl-O-p-nitrophenyl thiophosphate. The intermediate composition containing 54% of O-ethyl - S - ethyl - O - p - nitrophenyl thiophosphate was found to possess greater insecticidal activity than the starting material, O,O-diethyl-O-p-nitrophenyl thiophosphate. The end product after 10 hours of heating was found to possess several times the activity of the starting material.

*Example III*

To 100 g. of O,O-diethyl-o-p-nitrophenyl thiophosphate was added 2 g. of triethyl phosphate and the mixture was heated at 160 to 170° C. for 10 hours. The resulting product upon analysis was found to be predominantly O-ethyl-S-ethyl-O-p-nitrophenyl thiophosphate with a small portion of triethyl phosphate present. The product was found to possess greatly enhanced insecticidal activity.

One of the outstanding and unpredictable characteristics of the novel compound of the present invention is the greatly enhanced residual toxicity of the compound upon ageing. This has been demonstrated effectively by means of the following tests: Dilute solutions of the compound (1:2000) in acetone were sprayed on filter papers in Petri dishes and the solvent was allowed to evaporate from the sprayed papers. Insects were placed on the treated papers for a period of one hour and were then removed to a clean Petri dish. The percentage kill in 48 hours was observed. One day later the same treated papers were used in contact with another lot of insects. This procedure was repeated 3 or 4 days with the same treated paper. Each day there was a decrease in insecticidal activity in the treated paper. However, whereas the O,O-diethyl-O-p-nitrophenyl thiophosphate showed a lost of 30% of activity in 3 days, the O-ethyl-S-ethyl-O-p-nitrophenyl thiophosphate showed a loss of only 13% in the same period of time. These results serve to illustrate the enhanced utility of the novel compound of the present invention as an insecticidal agent. The compound may be formulated in the conventional manner with the aid of carriers, wetting, emulsifying and dispersing agents and other auxiliary agents for the provision of useful insecticidal compositions for agricultural and industrial purposes. The resulting compositions may be applied in the conventional manner by spraying or dusting in the desired locations.

What is claimed is:

1. The process comprising heating O,O-diethyl-O-p-nitrophenyl thiophosphate having the formula:

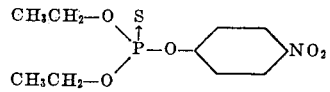

at a temperature in the range of from approximately 140° C. to approximately 180° C. for 1 to 10 hours.

2. The process comprising heating a mixture comprising O,O-diethyl-O-p-nitrophenyl thiophosphate having the formula:

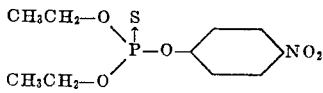

and a small portion of a substance selected from the group consisting of triethyl thiophosphate and triethyl phosphate at a temperature in the range of 140° C. to 180° C. for 1 to 10 hours, and subsequently steam distilling impurities from the resulting product.

HENRY L. MORRILL.

REFERENCES CITED

The following references are of record in the file of this patent:

UNITED STATES PATENTS

| Number | Name | Date |
|---|---|---|
| 2,471,464 | Toy | May 31, 1949 |

OTHER REFERENCES

Thurston: Field Information Agency Technical Final Report 949 (dated Oct. 14, 1946) (released May 30, 1947).

B. I. O. S. Final Report No. 1808, "Synthetic Insecticides" (1947), pp. 8 and 9.

"Manufacturing Chemist and Manufacturing Perfumer" (Dec. 1948), vol. 19, page 548.

Emmett et al.: "Jour. Chem. Soc. (London)," vol. 99 (1911), pp. 713 to 720.